PARAMETRIC DEVICES

Filed April 26, 1963 3 Sheets-Sheet 1

DIFFERENT EMBODIMENTS USING TWO CORES

1 = CLOCKWISE AMPERE TURNS
0 = COUNTER CLOCKWISE AMPERE TURNS

| CORE 1 WINDINGS | | | CORE 2 WINDINGS | | | PHASE |
|---|---|---|---|---|---|---|
| PUMP | BIAS | OUTPUT | PUMP | BIAS | OUTPUT | |
| 1 | 0 | 0 | 1 | 1 | 1 | A |
| 1 | 0 | 0 | 0 | 0 | 0 | |
| 0 | 1 | 1 | 0 | 0 | 0 | |
| 0 | 1 | 1 | 1 | 1 | 1 | |
| 1 | 1 | 1 | 1 | 0 | 0 | |
| 0 | 0 | 0 | 1 | 0 | 0 | |
| 0 | 0 | 0 | 0 | 1 | 1 | |
| 1 | 1 | 1 | 0 | 1 | 1 | |
| 1 | 1 | 0 | 1 | 0 | 1 | B |
| 1 | 1 | 0 | 0 | 1 | 0 | |
| 0 | 0 | 1 | 0 | 1 | 0 | |
| 0 | 0 | 1 | 1 | 0 | 1 | |
| 1 | 0 | 1 | 1 | 1 | 0 | |
| 0 | 1 | 0 | 1 | 1 | 0 | |
| 0 | 1 | 0 | 0 | 0 | 1 | |
| 1 | 0 | 1 | 0 | 0 | 1 | |

INVENTORS
ROBERT A. BRINKER
ALBERT BROWN
JOHN PRESPER ECKERT, JR.
LEONARD R. HULLS

BY

ATTORNEY

Jan. 17, 1967 J. P. ECKERT, JR., ETAL 3,299,277

PARAMETRIC DEVICES

Filed April 26, 1963 3 Sheets-Sheet 2

Jan. 17, 1967 J. P. ECKERT, JR., ETAL 3,299,277
PARAMETRIC DEVICES
Filed April 26, 1963 3 Sheets-Sheet 3

United States Patent Office 3,299,277

Patented Jan. 17, 1967

3,299,277

PARAMETRIC DEVICES

John Presper Eckert, Jr., Gladwynne, Albert Brown, Philadelphia, Leonard R. Hulls, Gwynedd Valley, and Robert A. Brinker, Philadelphia, Pa., assignors to Sperry Rand Corporation, New York, N.Y., a corporation of Delaware Filed Apr. 26, 1963, Ser. No. 275,888

6 Claims. (Cl. 307—88)

This invention relates to parametric devices, and more particularly to signal phase bi-stable parametric oscillators.

In the electronic data processing field, bi-stable devices are utilized for such purposes as storing information, counting, and the like. A bi-stable state device, for example, can store a representation of a "1" when it is in one of its two stable states and a representation of a "0" when it is in its other stable state.

Parametric oscillators have, in the past, been used as bi-stable devices. Generally, a parametric oscillator is a circuit having a reactance which is periodically varied so that oscillation occurs.

The prior art of parametric oscillators includes a device known as a parametron. A parametron includes a pair of cores in which a pump source having an alternating current at a frequency $f_p$ is coupled thereto by means of pump windings. A D.C. bias source is applied to the cores in the same manner and sense as the pump windings. Output windings of the cores are coupled together in an opposing manner to cancel induced voltages at the pump frequency. A capacitor is coupled across the output windings of the cores in a manner so that the output circuit is tuned to $f_p/2$. Such a circuit oscillates in either of two stable phases with respect to the pump source. The pump source is periodically clocked so that the circuit is, in effect, reset for subsequent operation. When the pump source is off, the circuit does not oscillate.

With such a device of the prior art, a "1" is represented by oscillation in one stable phase, and a "0" is represented by oscillation in the other stable phase. Special circuitry is required to detect the phase in which the circuit is oscillating.

It is desirable in information handling systems that the circuitry operate at high speeds and be reliable, inexpensive, and easy to manufacture. It is further desirable that circuitry for determining the phase of oscillation be eliminated thereby simplifying circuitry.

The present invention is directed to a circuit having one stable oscillating state which oscillates at a predetermined phase relationship and a second stable off state. This circuit is capable of operations at extremely high frequencies and, hence, at very high speeds.

It is an object of this invention to provide an improved bi-stable circuit.

Another object of this invention is to provide a novel parametrically excited oscillator which oscillates at solely one phase condition.

Still another object of this invention is to provide a novel parametric circuit which can oscillate in one distinct stable phase and which can operate in a distinct off condition with no oscillation.

In accordance with this invention, a pair of magnetic cores are used, preferably having substantially rectangular hysteresis characteristics. A pump source, which provides alternating current at a frequency $f$, is coupled to pump windings on both cores. The ampere-turn sense of the pump windings on both cores are both coupled in the same direction. A bias source is coupled to bias windings on both cores. The bias winding of one of the cores is coupled in the opposite ampere-turn sense from the bias winding for the other core. Output windings on both cores are coupled to a capacitor to form a tuned circuit resonant at a frequency $2f$, that is, twice the frequency of the pump source. The output winding for one core is coupled in the opposite ampere-turn sense from the output winding of the other core. Means are provided for inducing a signal into the output circuit at a frequency $2f$.

The circuit, as described, operates in a manner in which no oscillation occurs in the output circuit unless a signal source at a frequency $2f$ is applied having a specific phase relationship with respect to the pump source as described in more detail hereinafter.

Other objects and advantages of this invention, together with its construction and mode of operation, will become more apparent from the following description, when read in connection with the accompanying drawings in which.

Figures 1, 4:
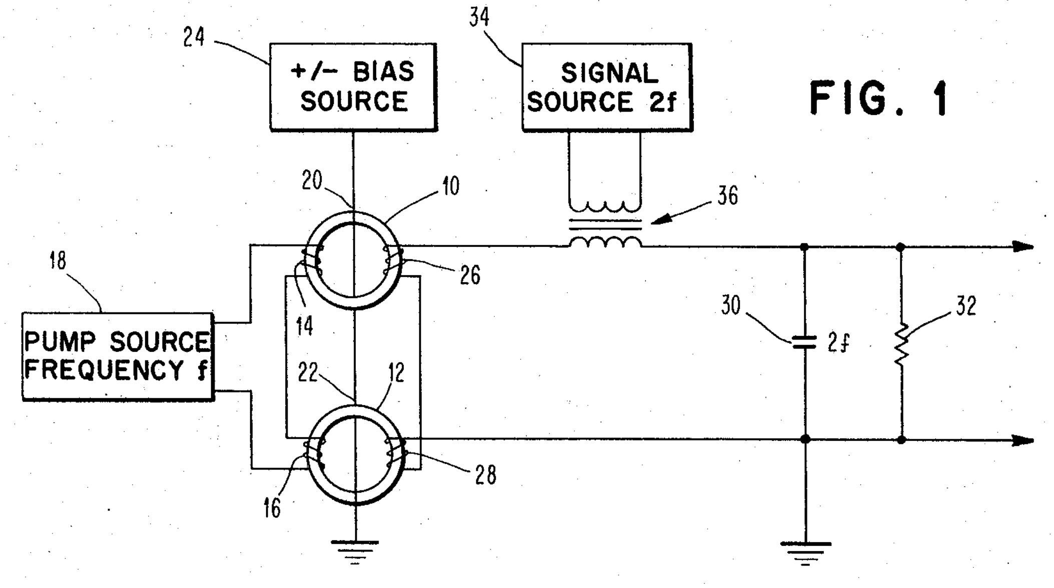
FIG. 1 is a block diagram of one embodiment of this invention.
FIG. 4 is a chart illustrating various embodiments of this invention with various ampere-turn connections of the pump, bias, and output windings and the corresponding phase relationship of the resultant output signal.

Referring to FIG. 1, there is shown a pair of magnetic cores 10 and 12 which preferably are of rectangular hysteresis characteristic. The magnetic cores can be annular ferrite cores, multi-aperture cores, or other magnetic elements such as thin films and the like.

The magnetic core 10 has a pump winding 14 coupled thereto, while the core 12 has a pump winding 16 coupled thereto. A pump source 18, which has a frequency $f$, is coupled to the pump windings 14, 16. As shown in FIG. 1, the pump windings 14, 16 are serially connected and are wound to the respective cores 10, 12 to produce a magnetic flux on said cores in the same direction with respect to each other.

A bias winding 20 coupled to the magnetic core 10 is serially connected to a bias winding 22 coupled to the magnetic core 12. A bias source 24 is coupled through the bias windings 20, 22 to a point of reference potential, such as ground. The bias windings 20, 22 are coupled to the cores 10 and 12 in a manner opposite to each other with respect to the pump windings 14, 16.

Output windings 26, 28, coupled to the cores 10 and 12, are coupled to a capacitor 30 to form a tuned circuit resonant at a frequency $2f$. The windings 26 and 28 are coupled to the cores 10 and 12 in a manner opposite to each other with respect to the pump windings 14, 16. A load resistor 32 is coupled across the capacitor 30. A signal source 34, which provides signals at a frequency $2f$, is coupled by suitable means 36, such as a transformer, to the tuned circuit 26, 28, 30.

Figure 2:
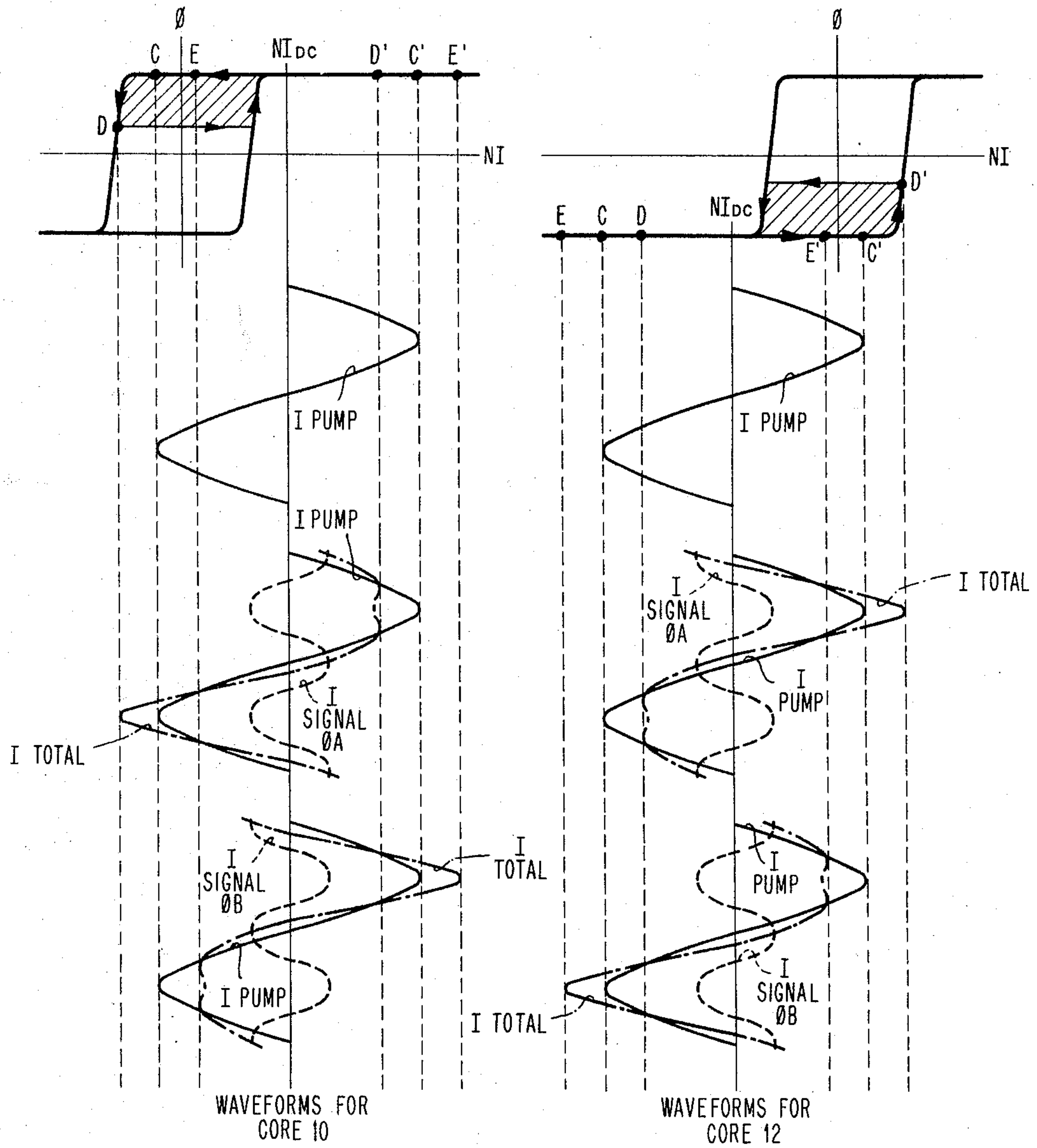
FIG. 2 is a set of illustrations showing the hysteresis characteristics of the magnetic cores together with electrical waveforms for application thereto.

FIG. 2 shows a set of hysteresis diagrams and waveforms for the circuit shown in FIG. 1. The upper left hand portion of the FIG. 2 shows a hysteresis characteristic for the core 10. The upper right hand portion of FIG. 2 shows a hysteresis characteristic for the core 12. The two hysteresis characteristics are substantially rectangular in character. With a positive bias voltage present, from the bias source 24, and the absence of a pump source, the core 10 is saturated in a positive direction to a point on the hysteresis curve at the designation $NI_{DC}$ as shown in the upper left hand portion of FIG. 2. In a similar fashion, since the winding 22 is coupled to the core 12 in the opposite direction, the core 12 is driven to its negative saturation point as shown in the upper right hand portion of FIG. 2 at the designation labelled $NI_{DC}$.

Upon initiation of the pump frequency from the source 18, the core 10 operates along the saturated portion of the hysteresis characteristic between the points C′ and C. Similarly, the core 12 also operates along its saturated portion of its characteristic between the points C′ and C. The slope of the cuve C, C′ is substantially flat, and hence, little or no change of inductance takes place due to the pump source. Therefore, an output signal due to parametric action does not occur. No output signal is induced by transformer action in the output circuit 26, 28, 30 because the output windings 26, 28 are coupled together in an opposed manner.

Upon inducing a signal at a frequency 2*f* having a phase A ($\phi$A as shown in FIG. 2), additional energy is added to the circuit to cause both cores to operate along the D′, D portions of the curves. As shown in the left hand portion of FIG. 2, the signal $\phi$A induced by the signal source 34 when added to the pump current yields an effective drive of I TOTAL which causes the core 10 to operate from the bias level (at $NI_{DC}$) to its saturated point D′ back through the bias level and, hence, sharply down to the point D on the hysteresis characteristic and then returning to the bias level $NI_{DC}$. The entire loop as shown in the shaded area of the curve is traversed.

Simultaneously, in a similar fashion, the magnetic state of the core 12 moves from the bias level ($NI_{DC}$) to the point D′ and back to the bias level enclosing the shaded area of the curve in a closed loop, and, hence, to D on the saturated portion of the curve and back to the bias level again.

Summarizing the action that takes place, both cores are initially biased to the saturated portions of their hysteresis curves. With the application of the signal source at the proper phase with respect to the pump source, the shaded portions of the curves are traversed. During the first half cycle of the pump source the magnetic state of the core 10 traverses the point from the bias level ($NI_{DC}$) to D′ and back to the bias level, with no substantial change in magnetization. During this first half cycle, however, the magnetic state of the core 12 is traversed from the bias level ($NI_{DC}$) to D′ and back to the bias level again traversing the entire loop shown in the shaded area. Hence, at the peak of the pump signal a rapid change in flux takes place towards the point D′ and, as the pump signal returns to 0 (toward the bias level $NI_{DC}$), another rapid change in flux again takes place as the core 12 once more becomes saturated. During the second half of the pump cycle, the magnetic state of the core 12 operates between the bias level ($NI_{DC}$) and the point D and back to the bias level again with no substantial change in flux. However, the magnetic state of the core 10 undergoes several changes in flux as the core 10 is driven from the bias level ($NI_{DC}$) to the point D and back to the bias level. A rapid change in flux takes place near the peak of the pump current as the point D is approached, and another rapid change in flux takes place as the pump current returns to 0 (to the bias level). The core 12, meanwhile, remains in its saturated condition. These changes in flux, therefore, occur near the peaks of the pump current and near the nulls of the pump current at four times per cycle of the pump frequency, occurring at, or approximately at, 90°, 180°, 270°, and 360° of the pump cycle. The change in flux that takes place causes a change in the inductance of the output circuit 26, 28, 30 since the rate of change of flux is proportional to the equivalent inductance of the windings. The tuned circuit 26, 28, 30 is tuned to be resonant at the frequency 2*f* during these transition periods.

The output windings 26, 28, being coupled in an opposed manner to the input windings 14, 16, cancel primary pump signals that would otherwise be induced into the output circuit. However, due to the change in inductance which takes place in the output circuit four times per cycle of the pump signal, the output circuit 26, 28, 30, is parametrically excited, amplifying the signal 2*f* presented by the signal source 34.

Figure 3:
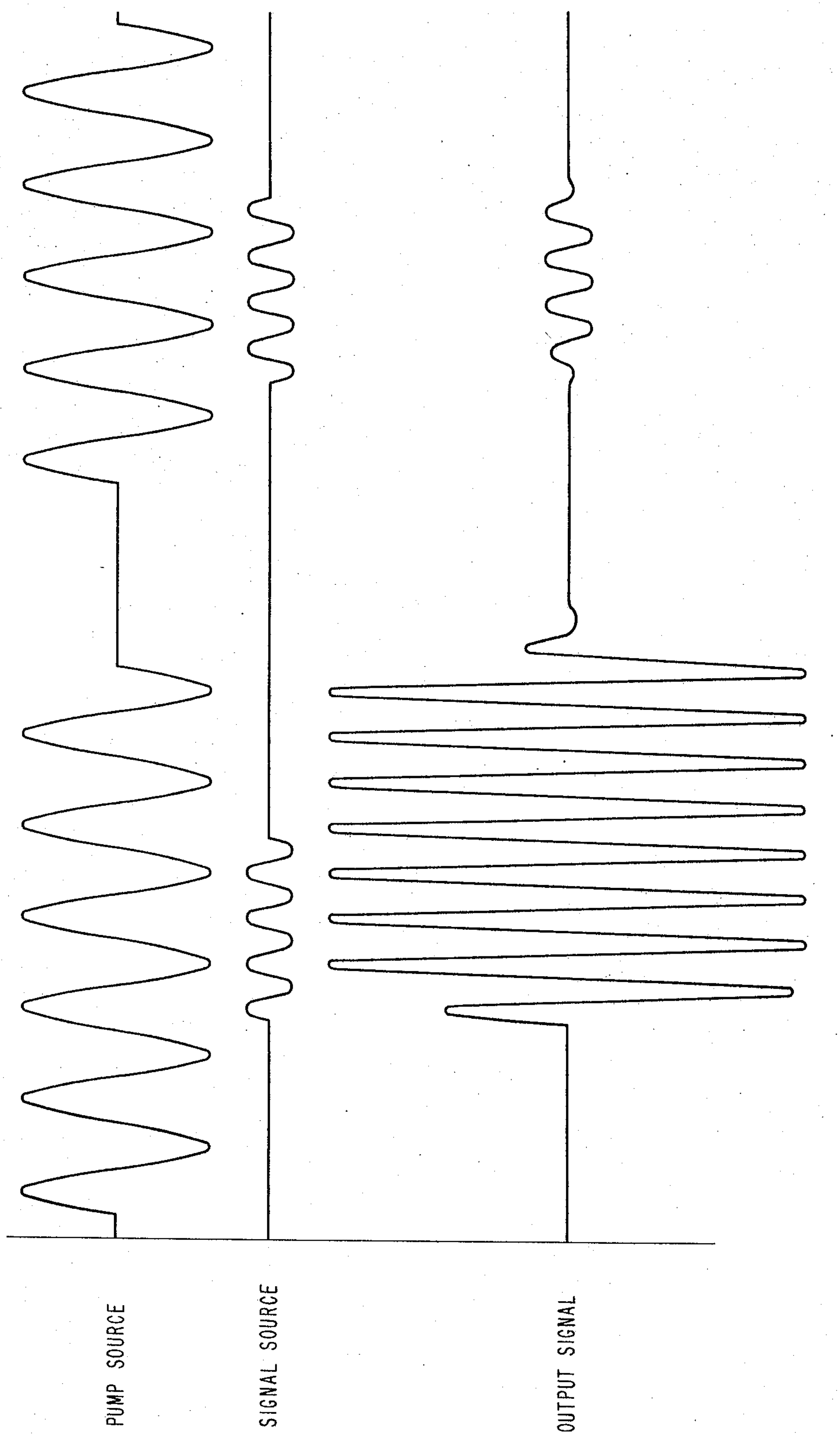
FIG. 3 is a set of three waveforms showing a clocked pump source signal, a signal source signal, and an output signal, each of the waveforms having a common time base.

A clocked pump source is illustrated in the upper waveform of FIG. 3. A signal from the signal source 34 at phase A, similar to that shown in FIG. 2, is illustrated at the left of the center waveform of FIG. 3. Due to the parametric effect of amplification in the output circuit, an output signal is generated having the same phase, phase A, as the signal source, during the duration of the pump source, upon the coincidence of the pump source and the phase A signal source, as illustrated at the left of the lower waveform of FIG. 3.

Upon the introduction of a signal from the signal source 34 at phase B, which signal 180° displaced from phase A, no amplification at the output circuit is produced. By the application of the phase B signals, as shown at the bottom of FIG. 2, the magnetic states of the cores 10 and 12 oscillate between the points E′ and E along the relatively flat saturated portions of the hysteresis characteristics. Therefore, no parametric excitation occurs, and, as shown in the lower waveform of FIG. 3 at the right-hand portion of the curve, no amplification takes place in the output circuit. Hence, the output signal is merely that signal directly induced by the signal source.

FIG. 4 is a block diagram or chart which shows the windings in various combinations that can produce the desired results in accordance with this invention. It will be recognized that many variations are possible by reversing polarities, turning the cores upside down, and by reversing the cores, and as shown in FIG. 4, a total of sixteen combinations are possible. However, of the 16 combinations, 8 can produce output signals at phase A with no output signals at phase B; while the other 8 can produce output signals at phase B only, no output signals being produced at phase A.

In another embodiment of this invention, a selective circuit for amplifying either phase A or phase B, as desired, is obtained by providing a bias source 24 which is selectively positive or negative. A positive bias source with the clockwise winding 20 produces saturation in the "positive" direction in the core 10, and, with the counter clockwise winding 22, produces saturation in the "negative" direction in the core 12. By the simple expedient of reversing the polarity source, the sense of the ampere-turns of the windings 20, 22 of the cores 10 and 12 reverse. By changing the direction of the ampere-turnage on both cores 10, 12, the circuit can be changed from a phase A to a phase B amplifier, and vice-versa.

Referring to the embodiment initially described as shown in FIGS. 1 and 2 where a positive bias source is utilized, the output circuit either oscillates at the phase A or does not oscillate. Oscillation is initiated by inducing a signal at twice the frequency of the pump source into the output circuit at the phase A. Upon termination of the signal from the signal source 34, the circuit continues to oscillate until the pump source is terminated or is otherwise clocked off.

The circuit can be, if desired, caused to oscillate at the phase B by selectively applying a negative bias source to the circuit in lieu of the positive bias source.

Other embodiments of this invention will be suggested to those skilled in the art without departing from the spirit and scope of the appended claims. For example, various connections can be made in a parallel configuration in lieu of a serial connection; FIG. 4 illustrates 16 combinations in which the pump winding, bias windings, and output windings can be coupled to the respective cores to produce the desired results.

At high frequencies, the hysteresis characteristics of the cores may no longer retain its rectangular properties.

However, the general operation of the circuit is substantially the same as that described herein.

Other bistable magnetic devices can be used in lieu of the annular cores illustrated in FIG. 1. For example, multi-aperture cores, and thin film magnetic devices can be used in accordance with the teachings of this invention.

The embodiments of the invention in which an exclusive property or privilege is claimed are defined as follows:

1. In combination, a first and a second magnetically saturable element each having a substantially rectangular hysteresis characteristic with relatively low $d\phi/d(NI)$ portions and relatively high $d\phi/d(NI)$ portions, each element having an input, a bias and an output winding coupled thereto, means for receiving a direct current bias source, means interconnecting said bias windings together in series so as to form a first polarity type series circuit, means coupling said receiving means to the bias windings of said elements for causing each of said elements to be driven to saturation each in a first direction, means for receiving an alternating current pump source having a frequency $f$, means coupling said pump source receiving means to the input windings of said elements in an opposed manner so that, alternately, said first element is driven further in said first direction while said second element is driven towards the opposite direction, and said first element is driven towards said opposite direction while said second element is driven further in said first direction; the alternation occurring normally about said low $d\phi/d(NI)$ portions of said hysteresis characteristics, means interconnecting said output windings together in series so as to form a first polarity type series circuit of the same type as said bias winding circuit, a capacitor coupled to said output windings and forming therewith a tuned circuit resonant at a frequency $2f$, and means coupled to said tuned circuit for inducing a temporary signal therein at a frequency $2f$, for inducing oscillation therein, whereby said tuned circuit continues to oscillate upon removal of said temporary signal and wherein said elements operate along both relatively high and relatively low portions of their hysteresis characteristics.

2. In combination, a first magnetically saturable element and a second magnetically saturable element each having a substantially rectangular hysteresis characteristic with relatively low $d\phi/d(NI)$ portions and relatively high $d\phi/d(NI)$ portions; a bias winding wound on each of said cores and interconnected together in series so as to form a first polarity type series circuit, a direct current bias source; means coupling said bias source to the bias windings of said elements for causing each of said elements to be driven to saturation, each in a first direction; an alternating current source having a frequency $f$; means coupling said alternating source to said elements in an opposed manner so that, alternately, (1) said first element is driven further toward saturation in said first direction while said second element is driven towards the opposite direction, and (2) said first element is driven towards said opposite direction while said second element is driven further toward saturation in said first direction, the alternation normally occurring about said low $d\phi/d(NI)$ portions of said hysteresis characteristics; an output winding wound on each of said cores and interconnected together in series so as to form a first polarity type circuit of the same type as the bias winding circuit, and a capacitor coupled to said output windings and forming therewith a resonant circuit tuned to a frequency $2f$.

3. The combination as claimed in claim 2 further including means coupled to said tuned circuit for inducing a temporary signal therein at said frequency $2f$, for inducing oscillation, whereby said tuned circuit continues to oscillate upon removal of said temporary signal and wherein said elements operate along both relatively high and relatively low portions of their hysteresis characteristics.

4. In combination, a first magnetic core and a second magnetic core, a first winding coupled to said first core in a clockwise direction, a second winding coupled to said second core in a clockwise direction, an alternating current source of frequency $f$ coupled to said first and second windings in a serial manner, a first bias winding coupled to said first core in a clockwise direction, a second bias winding coupled to said second core in a counter-clockwise direction, a bias source serially connecting said first bias winding and said second bias winding to a point of reference potential, a first output winding coupled to one of said cores in a clockwise direction, a second output winding coupled to the other of said cores in a counter-clockwise direction, a capacitor coupled to said output windings to form a closed loop tuned to a frequency equal to $2f$, and a selectively operable control signal source having a frequency of $2f$ coupled to said closed loop.

5. In combination, a pair of saturable magnetic cores each of which exhibit a substantially square loop hysteresis characteristic, each of said cores further having wound thereon, a supply winding, a bias winding and an output winding, means including a direct current bias source coupled to said bias windings and operable to selectively bias both of said cores to a first or a second saturated condition, said first and second saturated conditions being opposite one another, a supply source of frequency $f$ coupled to said supply windings and operable to drive one said core further into saturation and the other of said cores away from saturation during one half cycle of said supply source and to reverse this condition during the next half cycle of said supply source, a capacitor, a series connection of said capacitor and said output windings, said series connection forming a resonant circuit tuned to a frequency equal to twice the frequency of the supply source, and a control signal source means coupled to said resonant circuit and delivering to said resonant circuit a signal of frequency $2f$.

6. The combination of claim 5 in which the control signal source means is capable of delivering a signal of frequency $2f$ in either of two opposite phases.

References Cited by the Examiner

UNITED STATES PATENTS

| | | | |
|---|---|---|---|
| 2,927,260 | 3/1960 | Prywes | 307—88 |
| 3,056,039 | 9/1962 | Onyshkevych et al. | 307—88 |
| 3,184,601 | 5/1965 | Kosonocky et al. | 307—88 |

BERNARD KONICK, *Primary Examiner.*

TERRELL W. FEARS, G. LIEBERSTEIN, *Assistant Examiners.*